United States Patent [19]

Timo et al.

[11] 4,104,908
[45] Aug. 8, 1978

[54] BORE STRESS LIMIT INDEX

[75] Inventors: Dominic P. Timo; Ronald J. Placek; David C. Gonyea, all of Schenectady; Lloyd H. Johnson, Scotia; Jens Kure-Jensen, Schenectady, all of N.Y.

[73] Assignee: General Electric Company, Schenectady, N.Y.

[21] Appl. No.: 843,965

[22] Filed: Oct. 20, 1977

[51] Int. Cl.$^2$ .......................................... G01M 15/00
[52] U.S. Cl. ..................................... 73/117.3; 73/15.6
[58] Field of Search .................... 73/116, 117.3, 15.4, 73/15.6

[56] References Cited

U.S. PATENT DOCUMENTS

| | | | |
|---|---|---|---|
| 3,237,448 | 3/1966 | Howell et al. | 73/116 |
| 3,832,893 | 9/1974 | Dlugos et al. | 73/116 |
| 3,950,985 | 4/1976 | Buchwald et al. | 73/116 |
| 4,031,366 | 6/1977 | Hartung | 235/151.3 |
| 4,046,002 | 9/1977 | Murphy et al. | 73/116 |
| 4,051,720 | 10/1977 | Barrington | 73/116 |

FOREIGN PATENT DOCUMENTS 416,190  1/1967  Switzerland.

Primary Examiner—Jerry W. Myracle
Attorney, Agent, or Firm—James W. Mitchell; John F. Ahern

[57] ABSTRACT

A method and apparatus is disclosed for determining whether certain rotor stress values are exceeded during the thermal cycle of a turbomachine. The invention takes into account the rotor material and the behavioral characteristics of the rotor material above and below the Fracture Appearance Transition Temperature (FATT). The acquired data is stored to develop a rotor history useful in determining a rotor condition for maintenance and longevity purposes and further useful in determining the operating pattern of the turbomachine.

16 Claims, 4 Drawing Figures

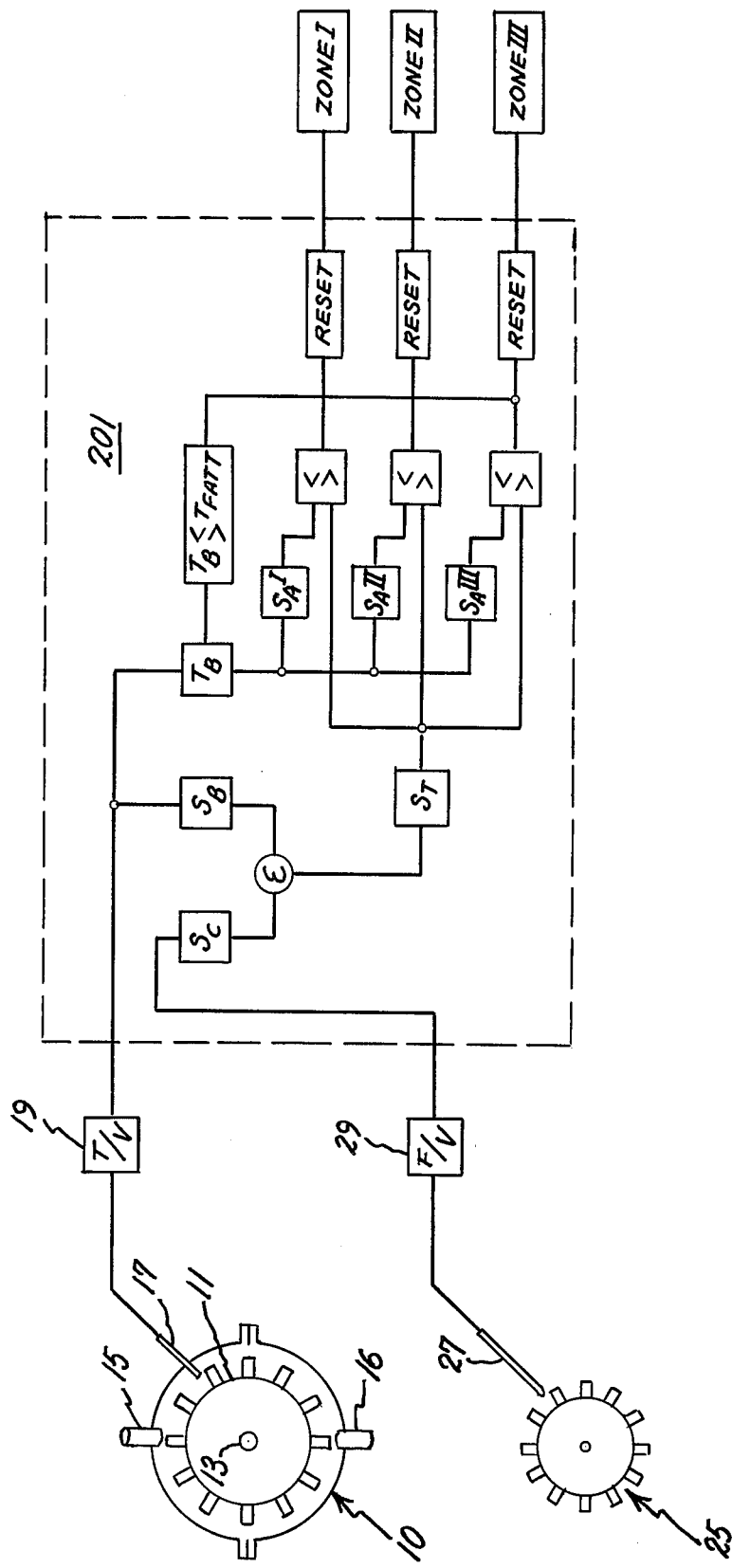

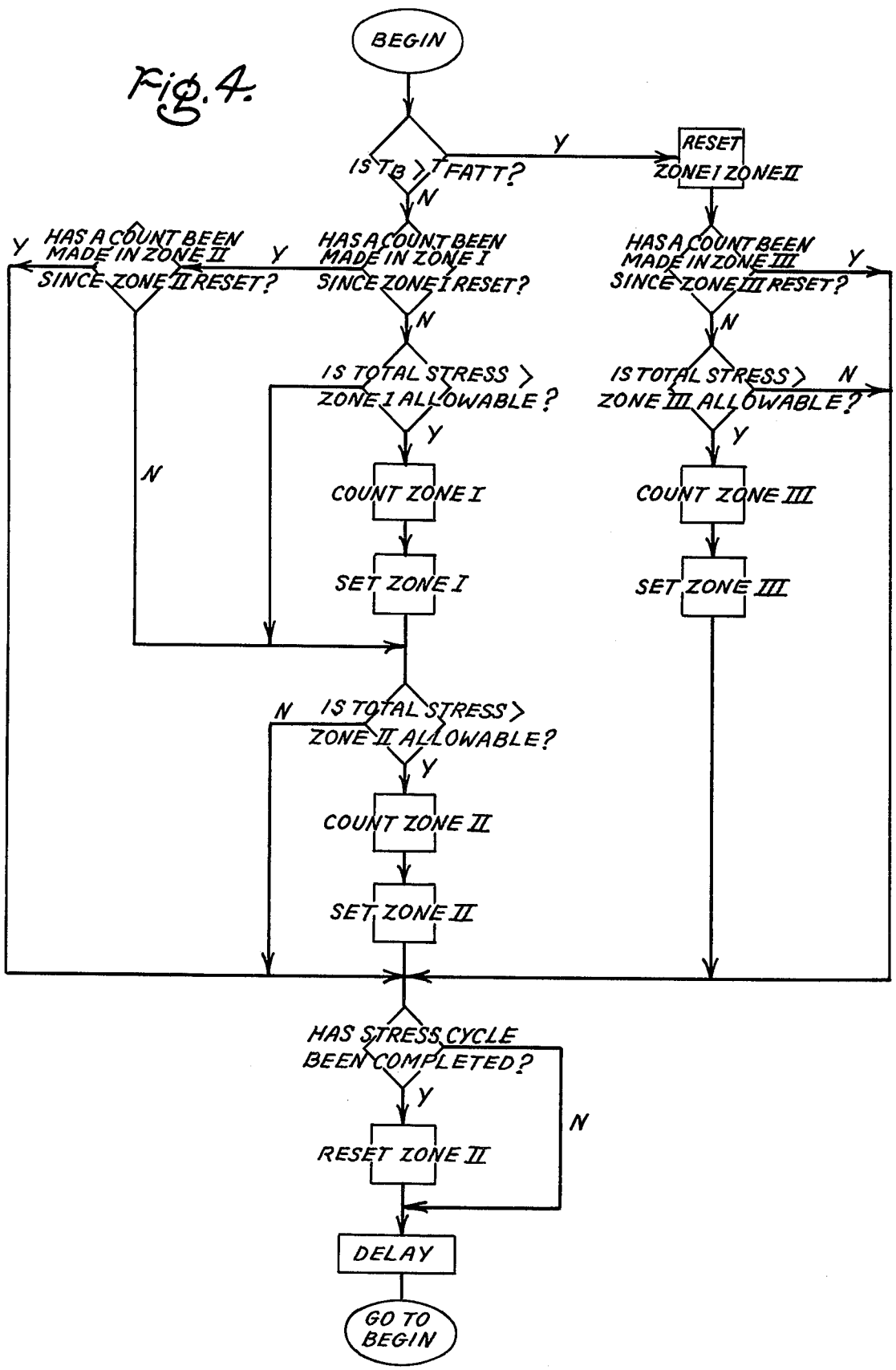

BORE STRESS LIMIT INDEX

BACKGROUND OF THE INVENTION

In general, this invention relates to a method and apparatus for accumulating certain data relevant to the operating history of a turbomachine and, in particular, this invention is especially applicable to data relating to "incidents" occurring at a turbomachine rotor bore.

The art of rotor forging or the formation of large diameter rotors for turbomachines of the type used in the generation of electrical power may result in the inclusion of stress risers or stress points in the vicinity of the centerline axis of the rotor. These built-in stress risers and stress points are inclusions and impurities which occur in the rotor at the time it is formed. These impurities, if left in place, could propagate or enlarge and may ultimately lead to reduced operating flexibility or an early replacement of a rotor into a turbomachine. It is therefore desirable to omit these imperfections at the rotor core and hence, it has become the practice of turbomachine manufacturers to bore out the rotor core so that a rotor bore hole several inches in diameter is formed at the rotor centerline. The rotor bore hole therefore obviates much of the undesirable material in the rotor while also providing a convenient site for rotor ultrasonic testing.

Modern rotor materials for steam turbine rotors are comprised of steel alloys which from a bore stress analysis point of view may have the following characteristics. At lower bore temperatures the rotor material exhibits brittle characteristics, whereas at higher bore temperatures the rotor material exhibits ductile characteristics. The boundary between the lower (brittle) and the higher (ductile) temperatures is the so called Fracture Appearance Transition Temperature (FATT) which may occur in modern rotor materials somewhere in the range of from 200° to 350° F. The Fracture Appearance Transition Temperature or transition temperature may be used to delineate certain temperature-stress regions according to one aspect of the invention. At temperatures below the transition temperature where the rotor material may exhibit more brittle characteristics the design concern is with rotor burst whereas at temperatures above the transition temperature the design concern is more directed toward crack elongation. According to the invention, certain stress values occurring below the transition temperature may be considered undesirable whereas those same stress values above the transition temperature may be considered acceptable. Hence, the transition temperature divides a stress versus temperature plot into brittle and ductile regions which thereafter may be subdivided in accordance with this invention into zones of potential risk.

One object of the invention is to determine whether the instantaneous bore temperature has exceeded the transition or FATT temperature in order to determine which allowable stress values (brittle or ductile) will apply.

Another object of the invention is to compare instantaneous bore stress values to allowable bore stress values to determine the occurrence of "incidents" wherein the actual calculated bore stress exceeds the allowable bore stress value.

Finally, it is a further object of the present invention to accumulate data relative to "incidents" in registers representative of the brittle side of FATT and the ductile side of FATT in order to determine the operating history of the rotor. The data can then be analyzed to determine the manner in which the turbomachine is being operated and the information can be further utilized as a basis for analyzing rotor condition without actually shutting down and inspecting the turbomachine. Further, the data is useful in planning a maintenance schedule for the turbomachine.

The novel features believed characteristic of the present invention are set forth in the appended claims. The invention itself, however, together with further objects and advantages thereof, may best be understood with reference to the following description taken in connection with the drawings.

BRIEF DESCRIPTION OF THE INVENTION

The invention relates to a method and apparatus which provides data useful in assessing the condition of a turbomachine rotor based upon its past history of operation. Briefly, the method comprises the steps of sensing turbomachine operating temperature and speed; determining instantaneous bore stress values and bore temperatures; comparing the bore temperature with the transition (FATT) temperature to determine whether the bore temperature is in a brittle or ductile region; comparing the instantaneous or actual bore stress with an allowable bore stress value; and, accumulating data in separate counter registers respectively scoring incidents in the brittle and ductile regions.

One apparatus useful in practicing the method of the present invention comprises speed sensing and temperature sensing means in combination with stress calculating and temperature calculating devices to derive a total bore stress and bore temperature. The instantaneous bore temperature is compared with $T_{FATT}$ to determine which allowable stress values pertain. Electronic function generators are used to generate electrical signals which are reference signals indicative of allowable stress values. The total bore stress is compared with the allowable bore stress in a plurality of electronic comparators the outputs of which are either high or low dependent upon whether the actual stress value exceeds the allowable stress value. A plurality of switches and relays provides logic for properly assigning the output signals from each comparator into a respective counter. The present invention may also be carried out electronically on a digital computer according to the following description.

BRIEF DESCRIPTION OF THE DRAWINGS

FIG. 3 is an illustration of the inputs and outputs to a computer means according to the method and apparatus of the present invention.

FIG. 4 is a logic diagram illustrative of the present invention.

DETAILED DESCRIPTION OF THE INVENTION

Figure 1:
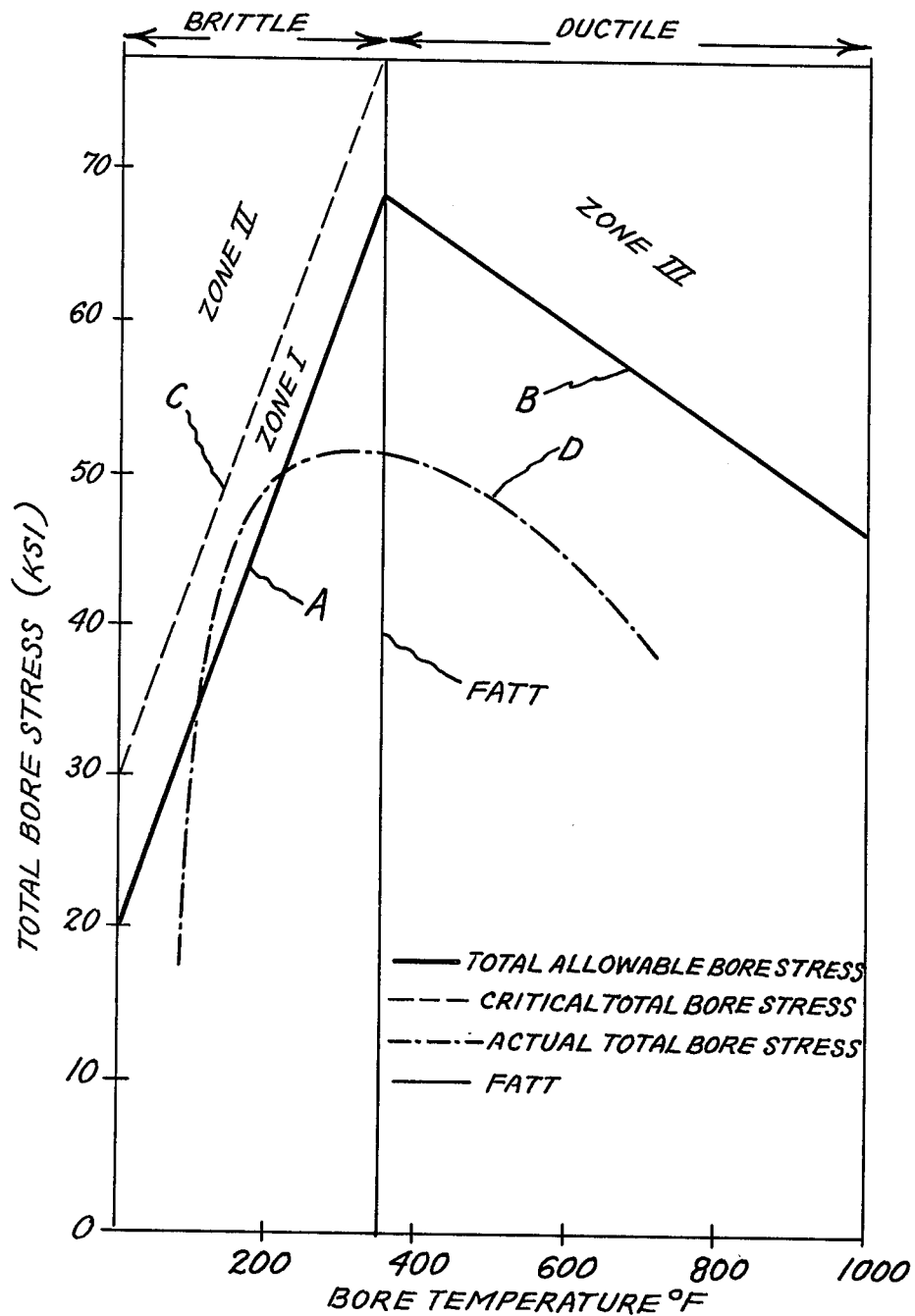
FIG. 1 is a graph of Total Bore Stress versus Temperature and indicates the transition temperature for brittle and ductile characteristics.

FIG. 1 is a graph which shows the Total Bore Stress (ordinate) versus the Instantaneous Bore Temperature (abscissa) for a typical rotor material such as a Cr-M-V steel. The Total Bore Stress is the summation of the rotor bore thermal stress and the rotor centrifugal stress. The transition temperature line FATT occurs at about 350° F for the typical modern rotor material. The transition temperature line for a particular material may be empirically derived by test specimens at different temperatures until a percent (usually 50%) division of brittle and ductile material in the test specimen is found after impact according to standard test procedures.

In accordance with the invention, the actual total bore stress is compared with an allowable total bore stress in order to determine whether or not a count should be made. The term "allowable" stress is used in a relative sense since if the "allowable" stress is exceeded the most dire consequence would be the recording of a count. Moreover, the so called "allowable" stress is based upon the possibility of a deterimental occurrence rather than an actual occurrence. Thus, the allowable bore stress is set at a predetermined level of risk rather than at any known point of failure.

The Brittle Region and the Ductile Region shown in FIG. 1 are further subdivided into Zones I, II, and III. Zone I represents a first probability of rotor burst failure at low temperature (below FATT) and has a lower limit line designated A. Zone II represents a higher probability of rotor burst failure at low temperature and has a lower limit line designated C. Zone III represents a level of risk at ductile temperatures wherein the concern is related to crack elongation within the rotor. Line D is an example of one start-up profile of a turbomachine for illustrative purposes.

It should be noted that in the brittle region, the lower allowable stress line A and the higher allowable stress line C are directly proportional to temperature. In the ductile region, the allowable stress line B is inversely proportional to temperature. The lines A, B and C are shown as straight lines since this is approximate, convenient and somewhat easier to simulate. However, it is within the scope of the present invention, to anticipate that higher order equations will yield curved lines for so called allowable or acceptable levels of stress. Moreover, it should be appreciated that the FATT or transition line is only approximate and that adjustments may be made for time changes which might occur in the material due to embrittlement of the material.

The lines A, B, and C in FIG. 1 are based upon known rotor material characteristics. For example, it is known that for rotor materials, crank growth may be limited to a realistic value if the total allowable bore stress is limited to 0.9 of the yield strength of the material. Hence, plotting these values versus temperature occurring in the Ductile Region will result in line B. Line B has an inverse slope consistent with the known dependence of yield strength on temperature. In the Brittle Region, lines A and C are derived from values obtained from the following known formula:

$$K_{IC} = \frac{2m}{\sqrt{\pi}} S_{CR} \sqrt{a}$$

where
$K_{IC}$ is the fracture toughness or critical stress intensity of the material at temperatures of interest;
$S_{CR}$ to be calculated at each temperature;
$a$ = crack size (in.); and,
$M$ = 1.21 (for circular surface crack).

The values of $S_{CR}$ may be plotted in the Brittle Region whereby line C may represent critical stress values $S_{CR}$ at a zero safety margin. Line A may then represent critical stress values which include an appropriate safety factor.

Curve "D" described by a dot-dash line shows a typical turbomachine start-up profile (stress/temperature) wherein an "incident" has occurred vis-a-vis an excursion into Zone I. According to the present invention, such a profile would result in a single count for the cycle. After a period of time in a power plant which experiences cyclic duty, the occurrence of incidents will yield a rotor history which will be useful in determining rotor condition, maintenance scheduling and operating procedures.

Figure 2:
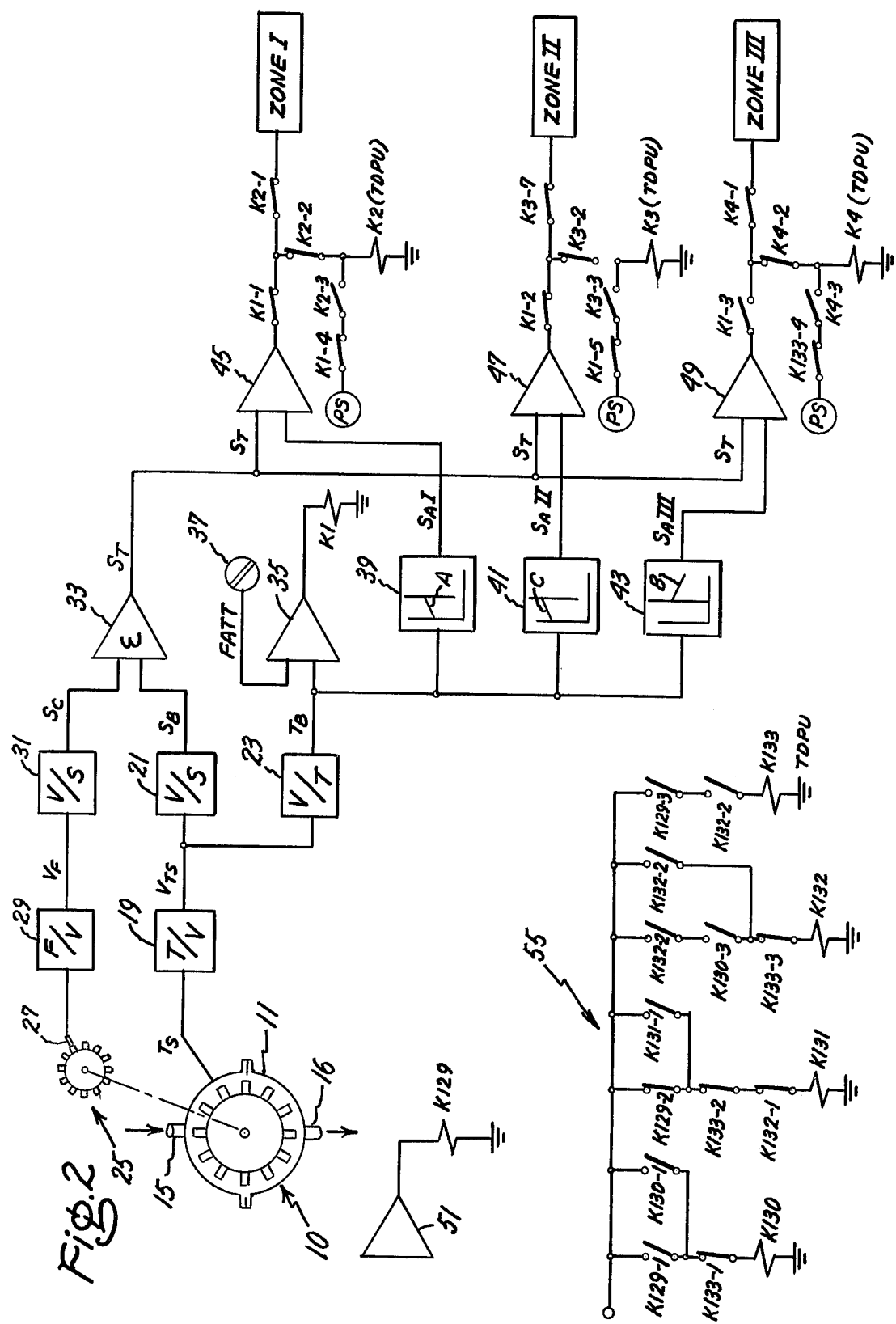
FIG. 2 is an electrical schematic of the present invention showing one means by which the method of the present invention may be carried out.

According to a preferred embodiment of the present invention, FIG. 2 shows electronic circuitry useful in performing the method of the present invention. A steam turbine 10 includes a rotor 11 having a rotor bore 13 formed therein. Steam is admitted into the rotor casing through inlet nozzle 15 and exhausted from the casing through outlet 16. Means are provided for sensing an operating condition of the turbine as, for example, the steam temperature $T_S$ about the rotor surface. Such temperature sensing means may include a thermal probe or thermocouple 17 which provides a temperature signal to temperature to voltage converter 19. The output of temperature to voltage converter 19 is a voltage signal $V_{TS}$ proportional to a steam turbine operating condition. The voltage signal proportional to steam temperature is then input into a bore stress calculator 21 and a bore temperature calculator 23. The construction and operation of these two devices is set forth in U.S. Pat. No. 3,446,824 to Zwicky patented May 27, 1969 and incorporated herein by reference.

A toothed wheel 25 or like device is driven by the turbine rotor and provides a part of the means for sensing turbine speed. A magnetic probe 27 is in close proximity to the toothed wheel and is electrically coupled to a frequency to voltage converter 29 whose output is a voltage level $V_F$ proportional to frequency or speed. The voltage level is then input into a centrifugal stress calculator 31 which converts the voltage input into a stress calculation. One example of a device capable of converting a voltage signal into a voltage proportional to centrifugal stress is given in the aforementioned Zwicky patent. The stress component Sc due to centrifugal force and the stress component due to thermal factors $S_B$ from calculator 21 are each input a summing amplifier 33 for summation of the total bore stress $S_T$.

The output from bore temperature calculator 23 is the calculated bore temperature $T_B$ which is input into comparator device 35. Comparator device 35 compares the input voltage $T_B$ from the bore stress calculator to the FATT or transition temperature which may be preset into the comparator by means of voltage adjustment screw 37. If the input voltage proportional to bore temperature $T_B$ is higher than the FATT temperature, then comparator 35 will go high and energize a relay K1.

Bore temperature $T_B$ is also input into function generators 39, 41, and 43 which may be considered as means for calculating an allowable bore stress limit. These devices are analogous to device 38 shown in the referenced Zwicky patent. Each of the function generators output a portion of the temperature versus "allowable" stress curve shown in FIG. 1. However, function generator 39 outputs line A, function generator 41 outputs line C and function generator 43 outputs line B.

There are three zone counters shown, for example, as part of a preferred embodiment of the invention. It is not unlikely that the number of zone counters could be increased or decreased in accordance with the specific requirements of a particular system not departing from the scope of the present invention. There is a comparator 45 which drives the counter in Zone I. Comparator 47 is associated with Zone II counter whereas comparator 49 is associated with Zone III counter. Each zone counter comprises a counter device which may have a non-volatile memory for storing counts in accordance with the switching logic yet to be described.

Each of the comparators 45, 47 and 49 has two inputs. One input is the total stress $S_T$ from the summing amplifier 33. The other input is the allowable bore stress from a respective function generator 39, 41 or 43. All switches are shown in their normal state prior to energization by the associated relay.

In explaining the switching logic associated with the aforementioned zone counters and comparators the operation of the device is also set forth as follows. The outputs of the zone counters I, II and III depend upon the output of its associated comparator, whether a count has been previously entered into the counter during the same thermal cycle and whether the FATT or transition temperature has been exceeded. In order for a count to be entered into the Zone I counter the total bore stress $S_T$ must exceed the allowable bore stress for that zone to cause an output from comparator 45. Two other conditions must also be satisfied. The bore temperature $T_B$ must be below the FATT or transition temperature so that relay K1 remains deenergized and so switch K1-1 remains closed. Also, no previous count should have been entered during the same thermal cycle or, in other words, no more than one count may be entered into the same counter without a reset. This result is caused by time delay to pick up (TDPU) relay K2 which opens its associated switches K2-1, K2-2 after a count and is held open by a power supply PS through switch K2-3. When the FATT is exceeded by the bore temperature, the K1 switches will open to reset the zone counter. In similar fashion, Zone II counter counts the excursions into Zone II as the total bore stress $S_T$ exceeds the allowable bore stress from function generator 41. Zone counters I and II are reset as the bore temperature goes above the transition temperature so that relay K1 is energized and relays K2 and K3 are deenergized.

Zone III counter operates as follows. As the FATT is exceeded, switch K1-3 will close as relay K1 is energized. Relay K4 will be energized to complete an electrical circuit to power supply PS through switch K133-4. The entire zone counter system is dependent upon the completion of a thermal cycle as best illustrated in U.S. patent application Ser. No. 738,321 filed November 2, 1976 to Murphy and Gonyea for Method and Apparatus for Determining Rotor Life Expended and now U.S. Pat. No. 4,046,002. In the Murphy et al patent, a complete stress cycle was taken as having a negative cooling half-cycle and a positive heating half-cycle. These cycles were tracked by amplifier 29 (FIG. 2) of the Murphy et al patent which turned on during the negative or cooling half-cycle. Likewise, a tracking amplifier 51 identical to amplifier 29 (Murphy et al) is used to control relay circuit 55. On the negative half-cycle, amplifier 51 turns on to energize relay K129 which stores the occurrence of the half-cycle in the relay circuit, particularly K130. On the positive half-cycle, amplifier 51 turns off and this occurrence is stored in relay K131. As a negative half-cycle is resumed, relay K132 is energized to ultimately energize relay K133 which opens switch K133-4 to reset the Zone III counter.

In FIG. 3, like elements are given the same numerical identity as the elements in FIG. 2. Again, a turbine 10 includes a rotor 11 having a rotor bore 13 and rotatable within the turbine casing by steam through nozzle 15 and exhaust outlet 16. Probe 17 senses the steam temperature or alternately may monitor the adjacent metal temperature. The steam temperature is converted to a proportional voltage in a temperature to voltage converter 19. Hence. means are provided for sensing an operating condition of the turbine. Likewise, means are provided for sensing the turbine speed and may include a toothed wheel 25, magnetic pick-up 27 the output of which is input into a frequency to voltage converter 29. Thereafter the signals may be introduced into a general purpose computer 201. The computer can be programmed by persons skilled in the art to provide the following calculations. The centrifugal stress component $S_C$ may be derived from the output of the frequency to voltage converter 29 and may further include buffer or matching circuitry and an analog to digital converter (not shown) prior to the calculation of $S_C$. From the steam temperature input the bore thermal stress $S_B$ and the bore temperature $T_B$ may be calculated. The total stress $S_T$ is the combination or summation of the centrifugal stress $S_C$ and the bore thermal stress $S_B$. The bore temperature $T_B$ is input into stress calculators $S_AI$, $S_AII$ AND $S_AIII$ which calculate the allowable stress at each instantaneous bore temperature. Calculations $\lessgtr$ are also included which compare the actual total bore stress $S_T$ with the allowable total bore stress for each zone to determine whether the allowable stress limit for the particular zone has been exceeded.

A comparison is made between the bore temperature $T_B$ and the FATT or transition temperature to determine whether FATT has been exceeded ($T_B \lessgtr T_{FATT}$). If yes, then only a count from Zone III calculator $S_AIII$ can be processed, If no, then Zone I and Zone II may be counted. Finally, a RESET box has been introduced to indicate that only one count can be stored per cycle in each counter, after which a reset must be made in order to make a count.

Referring to FIG. 4, a flow diagram better illustrates the logic of the present invention. The flow chart presumes the pre-calculation of bore temperature $T_B$ and total bore stress. A preliminary inquiry is made as to whether the bore temperature is greater than $T_{FATT}$. If yes, the program switches to Zone III. If no, the program examines Zones I and II for counts already made during the cycle and whether the total stress has exceeded the allowable stress for either Zone I or Zone II. The program will allow only a one count maximum per zone, per cycle. Zones I and II are reset as the bore temperature goes above $T_{FATT}$ whereas Zone III is reset at the completion of the thermal cycle.

While there has been shown what are considered to be the preferred embodiments of the present invention, other modifications may occur to those skilled in the art; and, it is intended to cover in the appended claims all such modifications as fall within the true spirit and scope of the invention.

What is claimed is:

1. In a turbomachine wherein certain turbomachine parts may be assigned allowable stress values based upon the operating temperature of the turbomachine; wherein the allowable stress values are a function of whether or not the machine operating temperature is above or below a transition temperature; a method for monitoring stress excursions within the turbomachine parts wherein the actual stress value may exceed allowable stress values comprising the steps of:
    comparing the turbomachine operating temperature with the transition temperature;
    counting stress excursions occurring below the transition temperature in at least one counter; and,
    counting stress excursions occurring above the transition temperature in at least one other counter.

2. The method recited in claim 1 wherein the transition temperature occurs between a material brittle region wherein allowable stress is directly proportional to operating temperature and a material ductile region wherein allowable stress is inversely proportional to operating temperature.

3. A method of monitoring the operation of a turbomachine part comprising the steps of:
    sensing the operating temperature of the turbomachine;
    dividing the stress temperature profile of the turbomachine into temperature zones;
    establishing an allowable stress for each temperature zone;
    determining the actual stress in the turbomachine part at each operating temperature;
    comparing the actual stress with the allowable stress in each temperature zone; and,
    selecting a count for a particular zone whenever the actual stress exceeds the allowable stress for that zone based upon the operating temperature of the machine.

4. The method recited in claim 3 wherein the dividing step includes the steps of:
    establishing a transition temperature for the turbomachine part whereby the temperature profile is divided into brittle and ductile regions.

5. The method recited in claim 4 wherein the establishing step includes the steps of:
    providing a first allowable stress versus temperature curve in at least one region to define a first level of operating risk; and,
    providing a second allowable stress versus temperature curve in the one region to define a second level of operating risk.

6. In a turbomachine including a rotor having an axial bore formed therein coincident with the rotor axis of rotation, wherein there is an allowable rotor bore stress which is pivotal about a predetermined transition temperature and characterized in that at temperatures below the transition temperature the allowable rotor bore stress is directly proportional to temperature whereas at temperatures above the transition temperature the allowable rotor bore stress is inversely proportional to temperature; a method for counting the incidents during which the actual bore stress exceeds the allowable bore stress on either side of the transition temperature comprising the steps of:
    sensing the operating temperature of the turbomachine;
    determining the actual rotor bore stress;
    calculating an allowable rotor bore stress based upon the operating temperature;
    comparing the operating temperature with the transition temperature;
    comparing the actual stress with the allowable stress to determine the occurrence of an incident;
    assigning a single count to each incident as the temperature goes from low to high;
    storing in at least one counter those counts occurring at operating temperatures below the transition temperature; and,
    storing in at least one other counter those counts occurring at operating temperatures above the transition temperature.

7. The method recited in claim 6 wherein there are at least first and second counters for storing separate counts based on incidents occurring below the transition temperature, said second counter preset to a higher allowable stress level than said first counter; and, at least a third counter for storing separate counts based on incidents occurring above the transition temperature; said method further including the steps of:
    activating the first and second counters if the operating temperature is below the transition temperature;
    activating the third counter if the operating temperature is above the transition temperature;
    storing a maximum of one count in each counter each time the operating temperature goes from low to high and an allowable stress for a respective counter is exceeded.

8. The method recited in claim 7 further comprising the steps of:
    resetting the first and second counters as the operating temperature exceeds the transition temperature; and,
    resetting the third counter at the completion of a thermal cycle.

9. The method recited in claim 7 further comprising the steps of:
    inhibiting, until reset, the storage of additional counts into a particular counter after an initial count has been made in the counter.

10. In a turbomachine including a rotor having an axial bore formed therein wherein there is an allowable bore stress and a predetermined transition temperature characterized in that at operating temperatures below the transition temperature the allowable rotor bore stress is directly proportional to temperature whereas at temperatures above the transition temperature the allowable rotor bore stress is inversely proportional to temperature; a method for counting the incidents during which the allowable rotor bore stress is exceeded on either side of the transition temperature comprising the steps of:
    calculating an actual rotor bore stress, an allowable rotor bore stress and a bore temperature;
    comparing the rotor bore temperature and the transition temperature;
    comparing the allowable bore stress and the actual bore stress;
    storing a single count in a first counter if the bore temperature is below the transition temperature; and the actual bore stress exceeds the allowable bore stress, and,
    storing a single count in a second counter if the bore temperature is above the transition temperature and the actual bore stress exceeds the allowable bore stress.

11. For a turbomachine which includes a rotor having an axial bore formed therein, there is a transition temperature below which the allowable rotor bore stress is directly proportional to temperature and above which the allowable rotor bore stress is inversely proportional to temperature; an apparatus is provided for counting incidents wherein the allowable bore stress is exceeded by the actual bore stress, said apparatus comprising:

means for measuring an operating temperature in the turbomachine;
means for measuring the turbomachine rotor speed;
means for determining the actual bore stress;
stress comparator means for determining the occurrence of an incident wherein the actual bore stress exceeds the allowable bore stress;
temperature comparator means for determining whether the operating temperature is above or below the transition temperature;
at least one counter for counting incidents occurring below the transition temperature; and,
at least one counter for counting incidents occurring above the transition temperature.

12. The apparatus recited in claim 11 further comprising:
means for converting said turbomachine operating temperature into a bore thermal stress;
means for converting said turbomachine rotor speed into a bore centrifugal stress; and,
means for combining the thermal stress and the centrifugal stress into an actual rotor bore stress.

13. The apparatus recited in claim 11 further comprising first and second counters for counting incidents occurring below the transition temperature, said first counter counting whenever the actual bore stress exceeds the allowable bore stress; and, said second counter counting whenever the actual bore stress exceeds the allowable bore stress by a predetermined amount.

14. The apparatus recited in claim 11 wherein each counter may receive a maximum of one count during each cold to hot cycle.

15. The apparatus recited in claim 13 wherein there is a third counter for counting incidents occurring above the transition temperature; and, further comprising:
first reset means for resetting said first and second counters as the operating temperature exceeds the transition temperature;
second reset means for resetting said third counter.

16. For a turbomachine including a rotor having an axial bore formed therein coincident with the rotor axis of rotation, wherein there is an allowable rotor bore stress which is pivotal about a predetermined transition temperature and characterized in that at temperatures below the transition temperature the allowable rotor bore stress is proportional to temperature whereas at temperatures above the transition temperature the allowable rotor bore stress is inversely proportional to temperature; a method for counting the incidents wherein the allowable bore stress is exceeded on either side of the transition temperature comprising the steps of:

measuring an operating temperature of the turbomachine;
measuring the speed of the turbomachine rotor;
calculating an actual rotor bore stress from said temperature and speed;
comparing the turbomachine operating temperature to the transition temperature to determine whether the operating temperature is above or below the transition temperature;
selecting a counter apparatus dependent upon whether the turbomachine operating temperature is above or below the transition temperature;
comparing the actual stress to the allowable stress;
counting incidents wherein the actual stress exceeds the allowable stress as the operating temperature goes from low to high.

* * * * *